No. 887,359. PATENTED MAY 12, 1908.
H. SYNCK.
MANURE SPREADER.
APPLICATION FILED JAN. 15, 1908.
2 SHEETS—SHEET 1.
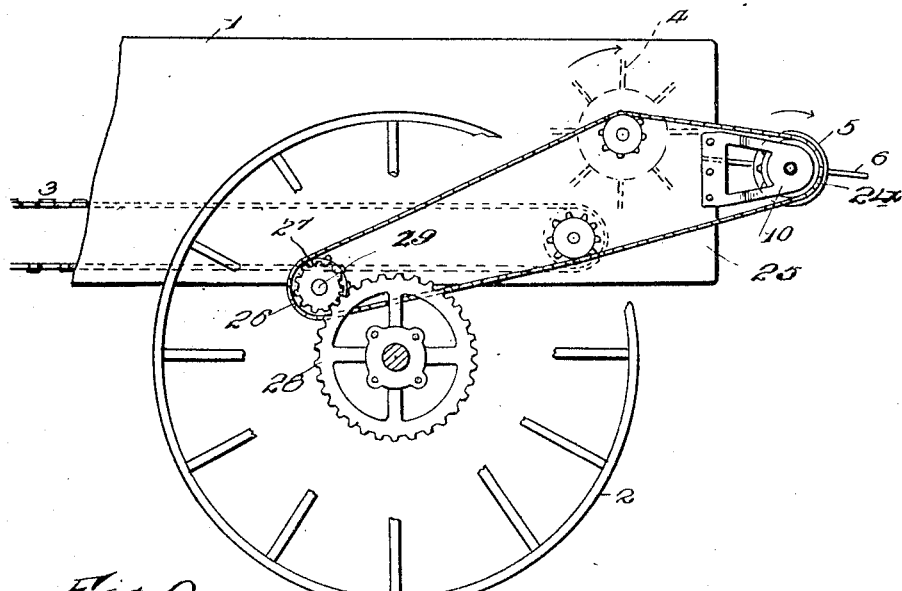
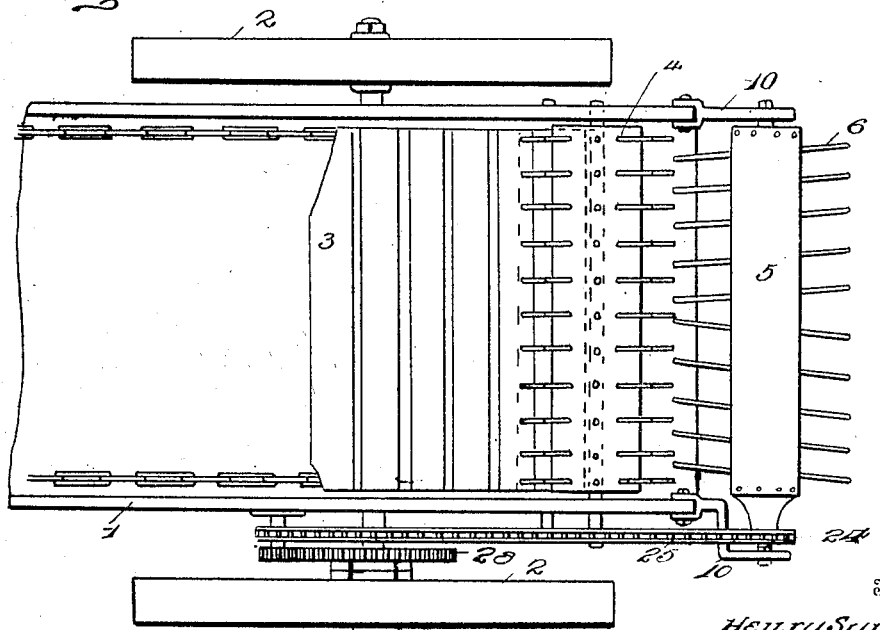
Witnesses
Inventor
Henry Synck
By
Attorneys No. 887,359. PATENTED MAY 12, 1908.
H. SYNCK.
MANURE SPREADER.
APPLICATION FILED JAN. 15, 1908.
2 SHEETS—SHEET 2.
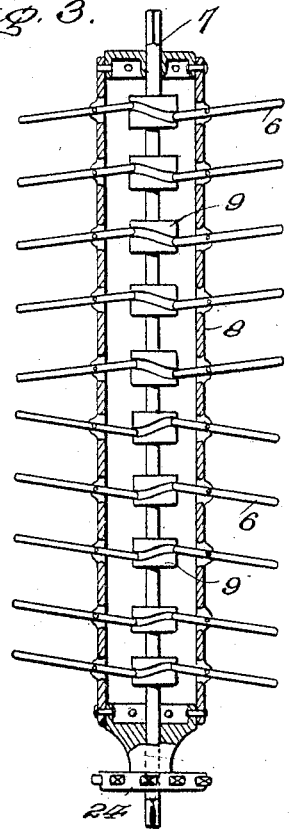
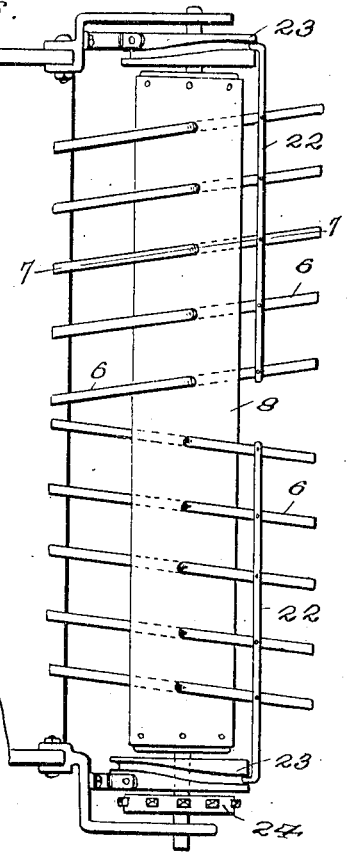
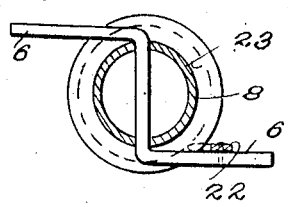
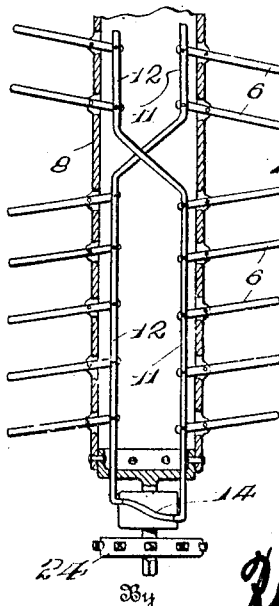
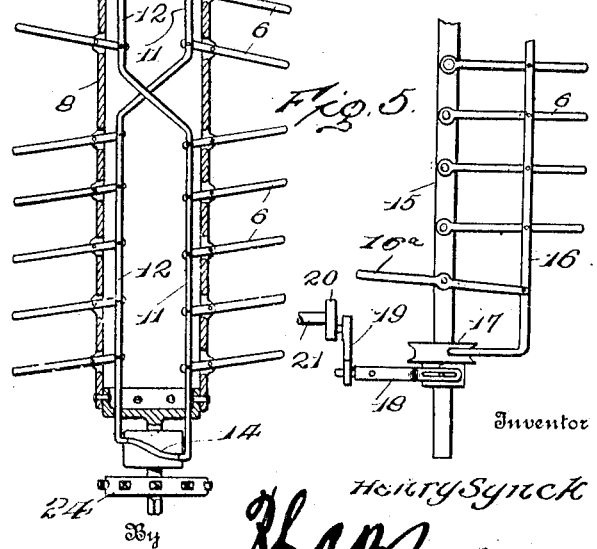
Inventor
Henry Synck
By
Attorneys
Witnesses

UNITED STATES PATENT OFFICE.

HENRY SYNCK, OF MARIA STEIN, OHIO.

MANURE-SPREADER.

No. 887,359.

Specification of Letters Patent.

Patented May 12, 1908.

Application filed January 15, 1908. Serial No. 411,012.

*To all whom it may concern:*

Be it known that I, HENRY SYNCK, a citizen of the United States, residing at Maria Stein, in the county of Mercer and State of Ohio, have invented certain new and useful Improvements in Manure-Spreaders, of which the following is a specification.

This invention is a device for pulverizing and spreading manure, or other fertilizer, or it may be used for spreading any other material broadcast. It is attached or may be built onto any bed or container holding such material in bulk and having means to feed the said material to this device which is to pulverize and spread it. It may form an attachment to any ordinary manure spreader which has a conveyer to convey the material backwards to a cylinder which would, in this case, act as a feeding arrangement to feed the material to the invention or bring it into contact with the same.

The object of this invention is to pulverize or, rather, re-pulverize the fertilizing material fed to it, since said material is to a certain extent already made fine and torn up by the feeding device acting upon it, and to spread the same over a wide area, much wider than is now accomplished with the present form of manure spreader in which the toothed cylinder serves both to pulverize and to spread the fertilizing material.

The device is mounted for rotation and as the material is thrown into its path, it is hammered to finer particles and said particles driven out over a wide area on account of the lateral swing given the rotating fingers or paddles, as they may be called, as will be explained later.

For a full understanding of the invention and the merits thereof and also to acquire a knowledge of the details of construction and the means for effecting the result, reference is to be had to the following description and acompanying drawings.

While the invention may be adapted to different forms and conditions by changes in the structure and minor details without departing from the spirit or essential features thereof, still the preferred embodiment is shown in the following drawings, in which:—

Figure 1 is a side view of the rear portion of an ordinary manure spreader having a conveyer and a toothed cylinder for delivering the material out of the machine and into the path of the rotating fingers or paddles of the invention which is attached thereto. Fig. 2 is a top plan view of the parts shown in Fig. 1. Fig. 3 is a longitudinal section of one form of the repulverizer and spreader. Fig. 4 is a modification showing an arrangement whereby a single cam operates the several series of fingers. Fig. 5 is a further modification. Fig. 6 is still another modification in which the opposite fingers are connected for simultaneous operation. Fig. 7 is a cross section on the lines 7—7 of Fig. 6.

Corresponding and like parts are referred to in the following description and indicated in all the views of the drawings by the same reference characters.

As before stated, this invention may be attached or built onto any bed or container holding such material as is to be pulverized and spread, in bulk, and which has an arrangement to feed this material out of and into the path of the invented device, but to make everything easily understood, we will assume that it is to be attached to an ordinary manure spreader having a conveyer to bring the manure or fertilizing material to the rear where a toothed cylinder feeds or throws it into the path of the rotating device.

The machine body 1 may be of any construction and capacity and mounted upon ground wheels 2 in the usual way. A carrier 3 forms the bottom of the said body so as to advance the fertilizer from the front to the rear as the same is fed out onto a toothed cylinder which throws it into the path of the invention and it is thereby repulverized and distributed in the operation of the machine.

The repulverizer and spreader, as I shall call my invention, is mounted to rotate about an axis and comprises a series of fingers or paddles 6 which are mounted to receive a vibratory movement simultaneously with the rotation of the part 5. Various means may be employed for imparting a vibratory movement to said fingers or paddles, some of which are shown in the various figures.

In order that the fertilizer or other material may be thrown laterally from the opposite sides of the spreader body 1, the fingers or paddles 6 are divided into series or sets, said fingers or paddles of the one end of the repulverizer and spreader being arranged to move to the right when the sets of fingers on the opposite side move to the left, in other words, the sets of fingers at opposite ends move simultaneously in opposite directions so as to throw fertilizer outward and sidewise at the same instant.

As shown most clearly in Fig. 3, the repulverizer and spreader consists of a shaft 7, drum 8, vibratory fingers 6, and operating cam 9. The shaft 7 is stationary and the ends which are made angular are fitted into angular openings formed in bracket 10 secured to the body and forming a support for the part 5. The drum 8 is mounted so as to rotate upon the shaft 7, and the series of fingers 6 are pivoted thereto between their ends, said fingers being arranged in straight lines which are located at diametrically opposite points. The inner ends of the fingers coöperate with the cam 9 so that in the rotation of the drum the fingers at the same time receive a vibratory movement in a plane at a right angle to the rotation of said drum. The cams 9 consist of collars or hubs fast to the shaft 7 and having serpentine grooves in their peripheries into which the inner end of the fingers 6 extend. As the drum rotates, the inner end of the fingers 6 traveling in the serpentine grooves of the cam, have a vibratory movement imparted thereto which movement serves to throw fertilizing material outward from the opposite sides of the machine thereby increasing the track of the distribution.

In the construction shown in Fig. 4, the shaft 7 is dispensed with and the inner ends of the fingers are connected by means of rods or bars 11 and 12. The series of fingers at one side of the drum and at one end thereof are connected to the series of fingers upon the other side and at the other end thereof by forming the rods to run across to the opposite side, hence as one set of fingers moves inward, the opposite set connected therewith moves outward, and as a like arrangement takes place with the other diagonally arranged sets of fingers, it will be understood that the sets of fingers on one side of the drum simultaneously move in opposite directions either inward or outward. The rods 11 and 12 at one end project beyond the drum 8 and are formed with lateral extensions which coöperate with a cam 14 similar in formation to any of the cams 9 and which cam is stationary and concentric with the axis of the drum.

In the construction shown in Fig. 5, the fingers 6 are pivoted at their inner ends to the rotating shaft 15 and are connected by means of a rod or bar 16, one end of which is in engagement with a grooved wheel 17 loose upon the shaft 15 and mounted to receive a reciprocating movement thereon so as to effect a vibratory movement of the finger 6. A lever 18 having engagement at one end with a lateral extension of the grooved wheel 17 is connected by means of a pitman 19 with crank wheel 20 fast to a shaft 21 adapted to be driven from any moving part of the machine. This arrangement dispenses with the drum 8.

It is to be understood that fingers project from opposite sides of the shaft 15 and in order that motion may be transmitted from one set of fingers to the other, a lever 16ª is pivoted between its ends to the shaft 15, one end of said lever being connected to the rod or bar 16 upon one side and the opposite end being adapted to be similarly connected to a rod or bar joining the other set of fingers, as will be readily comprehended.

In the construction shown in Figs 6 and 7, corresponding fingers 6 upon opposite sides of the drum 8 are connected for simultaneous movement, as is indicated most clearly in Fig. 7. Rods or bars 22 connect the series of fingers at opposite ends and their outer ends are bent or formed with lateral extensions to enter the grooves of the cams 23 which are stationary and mounted concentric with the axis of the drum.

The pulverizer and spreader is located in the rear of the wagon body 1 in such position as to receive the fertilizer from the toothed cylinder 4 and is provided with a sprocket wheel 24 around which passes a sprocket chain 25 which derives motion from a shaft 29 upon which is mounted a sprocket wheel 26 and a pinion 27, the latter meshing with a gear wheel 28 and having connection with a rear drive wheel 2.

Having thus described the invention, what is claimed as new is:—

1. In a machine for distributing compost or other material, the combination with the feeding or discharging mechanism, of a pulverizer and spreader mounted for rotation and comprising fingers or paddles for pulverizing and distributing the material fed to it, and which rotating fingers or paddles are adapted to have vibratory movement imparted thereto for throwing material laterally beyond the machine.

2. In a machine for distributing compost or other material, the combination with the feeding or discharging mechanism of a pulverizer and spreader mounted for rotation and comprising fingers or paddles, and means for vibrating said fingers or paddles while rotating, for the purpose set forth.

3. In a machine for distributing compost or the like fertilizer, the combination with the feeding or discharging mechanism of a combined pulverizer and spreader arranged to receive the material from the feeding or discharging mechanism, and mounted to rotate and comprising sets of paddles or fingers at opposite ends, and means for imparting vibratory movement to said fingers or paddles whereby the sets of fingers at opposite ends move simultaneously in opposite directions.

4. In a machine for distributing compost or other material, the combination with the feeding or discharging mechanism of a combined pulverizer and spreader mounted to rotate and comprising oppositely disposed sets of fingers or paddles and means for imparting vibratory movement to the sets of fingers or paddles in opposite directions whereby the sets of fingers or paddles upon the one side move in opposite directions synchronously with the sets of fingers upon the opposite side.

In testimony whereof I affix my signature in presence of two witnesses.

HENRY SYNCK. [L. S.]

Witnesses:
VINCENT F. LOCHTEFRED,
B. W. STARBENTE.